(12) United States Patent
Norman

(10) Patent No.: US 6,800,160 B2
(45) Date of Patent: Oct. 5, 2004

(54) STRESS-FREE MOUNTING SYSTEM FOR SHEET MATERIAL

(75) Inventor: L. C. Norman, Maitland, FL (US)

(73) Assignee: Water Bonnet Manufacturing, Inc., Casselberry, FL (US)

( * ) Notice: Subject to any disclaimer, the term of this patent is extended or adjusted under 35 U.S.C. 154(b) by 136 days.

(21) Appl. No.: 10/170,296

(22) Filed: Jun. 12, 2002

(65) Prior Publication Data

US 2002/0184842 A1 Dec. 12, 2002

Related U.S. Application Data

(60) Provisional application No. 60/297,703, filed on Jun. 12, 2001.

(51) Int. Cl.[7] .......................... B63B 17/00; B63B 19/00; E06B 3/30
(52) U.S. Cl. ....................... 156/108; 156/291; 114/361; 296/96.21
(58) Field of Search ............................. 156/108, 291; 114/361; 296/96.21

(56) References Cited

U.S. PATENT DOCUMENTS

| | | | | |
|---|---|---|---|---|
| 5,339,763 A | * | 8/1994 | Erskine | 114/361 |
| 5,367,977 A | * | 11/1994 | Ellis et al. | 114/361 |
| 5,664,519 A | * | 9/1997 | Erskine | 114/361 |
| 5,784,982 A | * | 7/1998 | Erskine | 114/361 |
| 2002/0174820 A1 | | 11/2002 | Shearer et al. | |

* cited by examiner

*Primary Examiner*—Sam Chuan Yao
(74) *Attorney, Agent, or Firm*—James H. Beusse; Beusse Brownlee Wolter Mora & Maire, P.A.

(57) ABSTRACT

An improved glass sheet support system eliminates the use of elastomeric gaskets for mounting glass sheets in metal frames and replaces the gaskets with elastomeric support members that are positioned within a channel of the metal frame to temporarily support the glass sheet. Permanent support of the glass sheet is then provided by utilizing a bonding agent to adhesively bond an edge of the glass to the metal frame. The temporary elastomer support members may be short sections of elastomeric material laid into the channel and having sufficient length and spacing to adequately support the glass sheet in the metal frame until such time as the bonding agent has set. A plastic insert in the form of an elongated strip of material that can be snapped into place between the glass sheet and the upper edges of the channel fills the space between the glass and frame and provides a clean cosmetic edge. In the case of a boat windshield, the invention includes an improved mounting of the windshield to the deck of a boat. The invention further includes an improved mounting system for snap buttons on metal frames such as used on boat windshields.

7 Claims, 3 Drawing Sheets

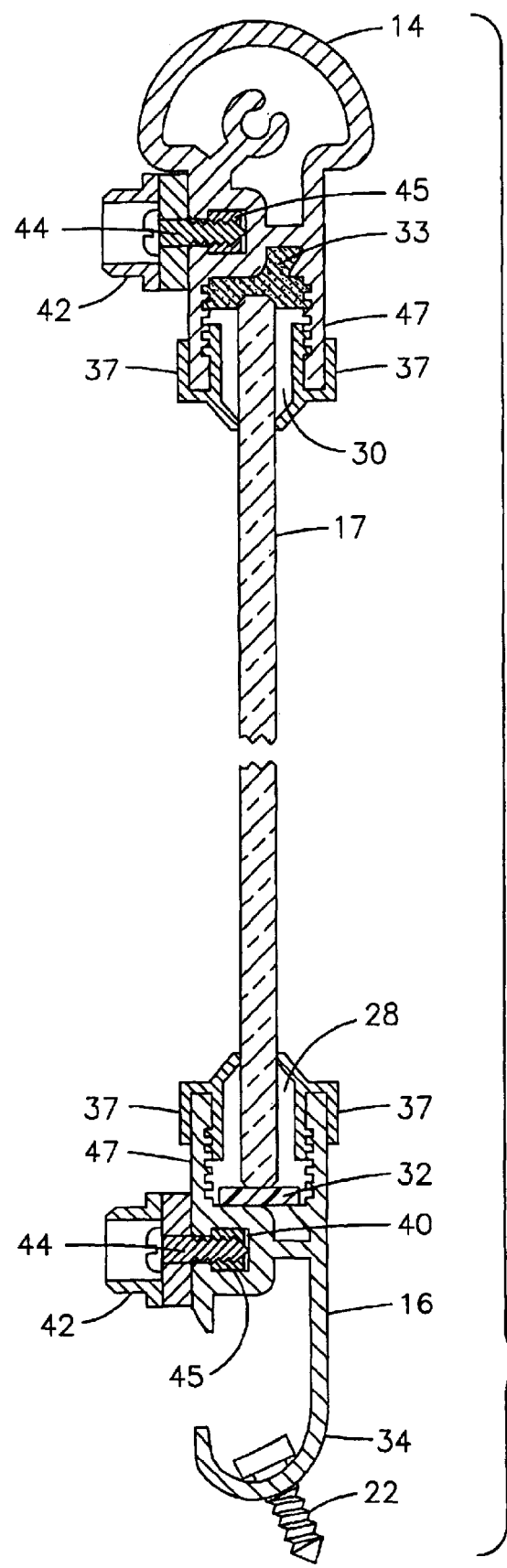
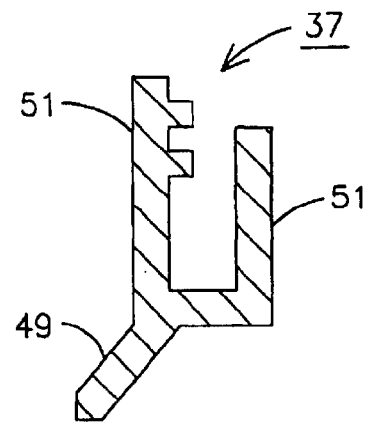
FIG. 2
FIG. 4

180
STRESS-FREE MOUNTING SYSTEM FOR SHEET MATERIAL

SPECIFIC DATA RELATED TO THE INVENTION

This application claims the benefit of U.S. provisional application Serial No. 60/297,703 filed Jun. 12, 2001.

BACKGROUND OF THE INVENTION

The present invention relates to a method and apparatus for mounting sheet material in a frame and, more particularly, to a method and apparatus for stress-free mounting of frangible sheet material such as glass in a metal frame.

There are numerous applications in which frangible sheet material is mounted in and supported by a circumscribing metal frame. For example, sheet material such as glass is commonly mounted in a metal frame for application in sliding glass doors, shower enclosures and doors, doors for industrial equipment and windshields on such items as boats. The present invention is particularly useful in the mounting of curved glass into metal frames wherein the metal frame may be subject to deflection stresses. For example, the invention is particularly useful in minimizing stress transmitted to curved glass sheets used in the windshields on a boat deck in which the deck may be subject to transverse deflection thereby stressing the glass held within a metal frame surrounding the glass. The glass sheet and metal frame forms a windshield for the boat and is typically fastened to the deck of the boat such that the lower metal frame of the windshield is fixed to the boat and flexes with any motion of the deck. In any of the above-described applications, the metal frame or track protects the edge of the glass sheet and provides for a method of mounting or attaching the glass sheet to some other structure.

While the present invention is useful in the mounting of any form of frangible sheet member into a metal frame, the invention will be described herein with regard to one particular application of mounting of a frangible sheet member into a metal track for use on a boat. In this application, the combination of the metal frame or track with the frangible sheet member creates a windshield for the boat. By way of example, many of the windshields used on boats are generally triangular shaped, starting at a height of about 1½ to 2 feet at a forward center line of the boat and terminating at essentially a point along a side of the boat. In this triangular windshield configuration, the windshield comprises a triangular shaped, curved glass sheet mounted into upper and lower metal tracks. The upper and lower tracks are normally fastened to one another at a side of the boat. A separate short track section connects the upper and lower track sections near the forward center line of the boat to complete the surrounding metal frame for the windshield. Typically, the metal frame is formed from aluminum and includes a track into which the edge of the glass sheet fits. In a conventional windshield, the aluminum track includes a rectangular channel in which an elastomeric gasket is fitted. The gasket may be formed of vinyl or other suitable elastomeric material. The gasket is shaped to have the same configuration as the track into which it fits and defines a separate channel for receiving an edge of the glass sheet. In general, the gasket is designed to have a very tight fit about an edge of the sheet when the glass sheet and gasket are forced into the channel in the metal track. In one prior art system, the glass track and gasket are bonded together by using an adhesive material in the channel. Typically, holes are cut into the gasket material adjacent to the bottom of the channel and a bonding material inserted into these holes prior to forcing the glass sheet into the gasket and channel combination. Once the adhesive material has set, it will bond the glass sheet to the metal track. A typical type of adhesive material used for this purpose is a urethane bonding material.

One of the problems which has been identified with this type of assembly is that the edges of the gasket material adjacent to the cut out sections or holes are not firmly maintained within the channel in the track. While these side edges can be pushed down into the channel, it is not unusual for the line that is formed by the edge of the gasket material along the glass sheet to be noticeably deformed and detract from the overall appearance of the windshield. Further, the tight fit between the glass sheet and the metal track allows stresses imparted on the metal track to be directly transferred to the glass sheet. Any stresses that are transverse to the direction of the glass sheet tend to want to deform the glass sheet and can lead to cracking or breaking of the sheet.

In addition to the above-described issues regarding the transfer of stress to the glass sheet of the windshield assembly, in boat applications, movement of the deck translates into additional stress placed on the portion of the windshield frame that is attached to the deck. Accordingly, it would be desirable to provide an attachment mechanism for a windshield to a deck which reduces the amount of stress transferred from the deck to the windshield frame.

Still another issue which arises in the context of the use of metal frame members for supporting frangible sheet materials is the connection of attachments to the frame member to enable coupling of other devices to the frame. For example, it is common to attach metal buttons to the frame of a boat windshield in order to couple a canvas cover to the windshield. In this particular application, the frame member for the windshield includes a horizontal slot which can be used to receive a plastic insert into which a threaded portion of a button can be screwed. In that application, threading the portion of the button into the plastic insert expands the insert and clamps it tightly within the frame member. However, it is not uncommon for the plastic to deform or be worn and allow the button to become loose and slide or even be lost from the frame member. Accordingly, it would be desirable to provide a more secure mounting for such attachments to a frame member of a windshield.

SUMMARY OF THE INVENTION

The present invention addresses the problems associated with stress imparted to a glass sheet through a metal track and also the problem associated with appearance or cosmetics of an assembled glass sheet and metal track when a conventional elastomeric gasket is not firmly seated within a channel of the metal track to support the glass sheet. In one form, the present invention eliminates the use of the elastomeric gasket of the prior art type and replaces the gasket with an elastomeric support member that is positioned within the channel of the metal track to temporarily support the glass sheet. Permanent support of the glass sheet is then provided by utilizing a bonding agent to adhesively bond an edge of the glass to the metal track. Preferably, the bonding agent is a urethane bonding agent or other suitable bonding agent that has a durometer reading of less than about 85 to 90 after the bonding agent has set. The temporary elastomer support sections may be short sections of elastomeric material laid into the channel on the bottom of the track and having sufficient length and spacing to adequately support the glass sheet in the metal track until such time as the bonding agent has set. The bonding agent may simply comprise periodic globules of the agent between the temporary elastomeric supports. Since the channel-shaped gaskets typical of the prior art provided an elastomeric spacing between sides of the glass sheet and the metal track, the absence of these elastomeric gaskets leaves a narrow space adjacent to each side of the glass sheet inserted into a channel of the track. The present invention utilizes a plastic insert in the form of an elongated strip of material that can be snapped into place between the glass sheet and the upper edges of the channel to fill the space between the glass and track and to provide a clean cosmetic edge. The plastic material may be polyvinyl and, in addition to providing improved cosmetic appearance, also minimizes water and air infiltration along the edges of the glass-to-track interface.

The present invention further addresses the reduction of stresses imparted to a boat windshield by providing an improvement of mounting the windshield to the deck of a boat. In the disclosed method, the windshield may be mounted at each end of the windshield frame and at one additional location that is just forward of the curve in the windshield as the windshield is curved around the forward portion of the boat deck. This arrangement provides essentially a three-point mounting system with a large section of the frame being allowed to float on the surface of the boat deck between the most rearward mounting point and a position forward of the curved portion of the windshield. Since most of the movement of the boat deck occurs in this region, this mounting arrangement reduces the stresses imparted to the windshield by movement of the boat deck.

The invention also addresses the issues of attachment of threaded members into a slot on a forward surface of a metal frame for a frangible sheet member. In the present form, threaded members such as buttons are attached to the metal frame by threading into a plastic insert having relatively thin sidewalls so that threading of the button causes the threads to cut through the plastic sidewalls and extend outward therefrom rather than expanding the sidewalls. In this manner, the threads of the insert cut into the actual metal material of the frame and bind directly to the frame rather than being attached by means of expansion of the plastic member. Accordingly, extended use of the attachment does not create wear such that the attachment becomes loose within the frame.

BRIEF DESCRIPTION OF THE DRAWINGS

For a better understanding of the present invention, reference may be had to the following detailed description taken in conjunction with the accompanying drawings in which:

FIG. 2 is a cross-sectional view of a windshield constructed in accordance with the teachings of the present invention;

FIG. 4 is a cross-sectional view of one form of decorative trim strip;

DETAILED DESCRIPTION OF THE INVENTION

Figure 1:
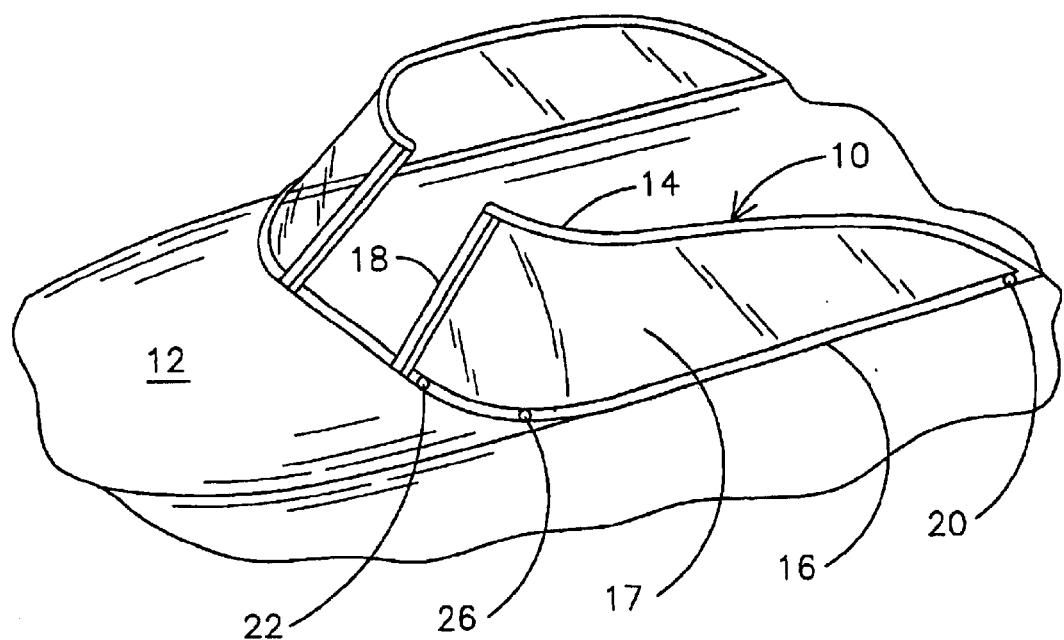
FIG. 1 is a top plan view of a windshield mounted on a deck of a boat.

Turning now to FIG. 1, there is shown a top perspective view of a windshield 10 mounted on a boat deck 12 which illustrates one facet of the present invention. The windshield comprises an outer metal frame having a top portion 14 and a bottom portion 16 supporting a glass sheet 17. A vertically connecting frame member 18 connects the upper and lower frame sections 14, 16. The frame members 14,16,18 are sometimes referred to as tracks. As shown in the figure, the windshield 10 is mounted to the boat deck by a fastener, such as screw 20, at the rearward portion of the windshield where the upper and lower frame members 14,16 connect. In addition, another fastener 22 is positioned at the forward end of the windshield near the centerline 24 of the deck 12. A third fastener 26 is located just forward of the curved portion of the windshield. No additional fasteners are needed nor desired to attach the windshield 10 to the boat deck 12. As a consequence of the disclosed mounting arrangement, any movement of the deck 12 between the fastener 20 and the fastener 26 is not translated directly into movement of the lower frame member 16. Thus, stress created when the boat turns and causes deflection of the boat deck 12 is not carried into the frangible glass sheet 17 of the windshield. In other words, the boat deck 12 can deflect to some degree under the frame portion 16 without placing stress on the frame.

Figure 3:
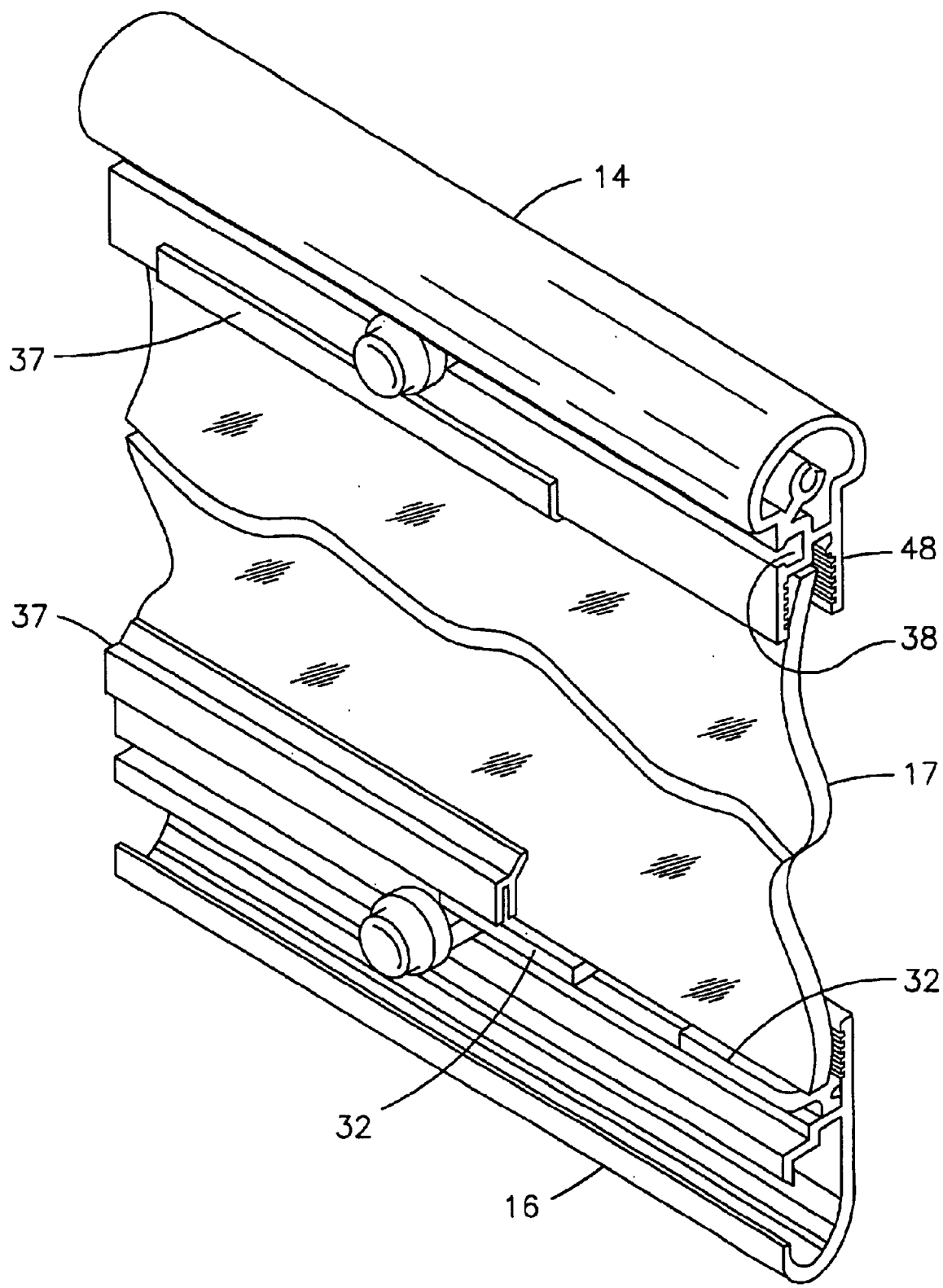
FIG. 3 is a perspective view of the windshield of FIG. 2.

FIG. 2 is a cross-section of the windshield 10 shown in FIG. 1 illustrating the configuration of the lower track or frame portion 16, upper track or frame portion 14 with the glass sheet 17 positioned in the two tracks. The glass sheet 17 seats in channels 28,30 in respective ones of the tracks 16, 14 with a plurality of spaced elastomeric strips 32 positioned along a bottom of each of the channels to support peripheral edges of the glass sheet 17 in spaced relationship from each of the bottoms of the channels within the frame members 14, 16. As can be seen by reference to the partial cutaway view of FIG. 3, the elastomeric strips 32 are spaced apart and may be approximately two inches long, ⅛ inch in height and about ½ inch wide. The strips may be spaced about every 10 inches along the length of each of the tracks 14,16 and 18. It will be appreciated that these dimensions are provided only by way of example and will change depending on factors such as track dimension and overall size.

Between each of the elastomeric strips 32, there is deposited a bonding agent 33 which functions to adhesively attach the sheet member 17 to the respective ones of the tracks 14,16,18. The bonding agent may comprise a urethane adhesive suitable for attachment of glass to aluminum. A preferred adhesive will have a maximum Durometer hardness of about 85–90 so that there is some degree of resiliency between the glass edge and metal track. However, the adhesive should have sufficient strength to withstand normal pulling of the upper track 14 by a person using the windshield to assist in standing in a boat.

The tracks 14,16 are somewhat different in cross-section but are conventional in the industry. The lower track 16 has a bottom curved segment 34 which is adapted for seating on a boat deck. The fasteners 20,22,26 are inserted through forward slot 36 and into holes in segment 34 to attach the track 14 to a boat deck. The slot 36 is then filled with a decorative trim strip, typically formed of a vinyl or polyvinyl material.

Figure 6:
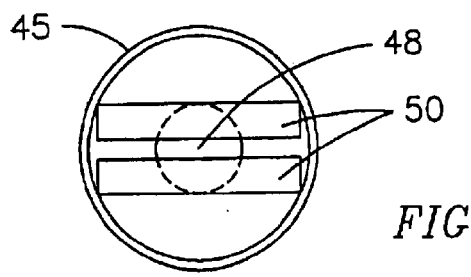
FIG. 6 is an end view of the stud base for the fastener of FIG. 5.
Figure 5:
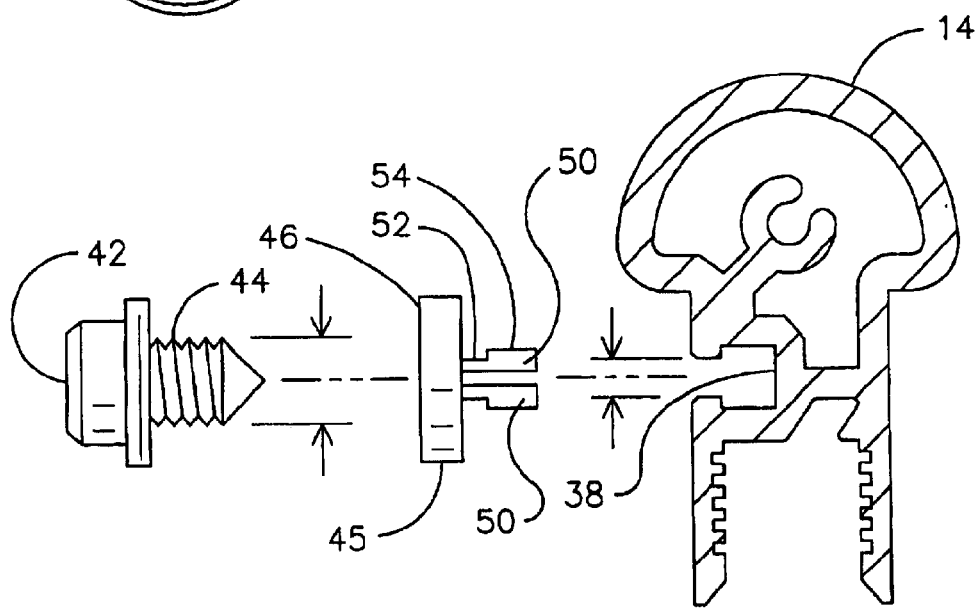
FIG. 5 is an exploded view of a snap fastener assembly in accordance with one embodiment of the invention.

Along the forward facing surface of each track 14,16 there is another slot 38,40, respectively. The slots 38,40 are narrow and are commonly used for other attachments to windshields, such as the snap buttons 42 shown in FIGS. 2 and 3 and in more detail in FIGS. 5 and 6. One of the features of the present invention is a method and apparatus for secure attachment of the buttons 42 to the tracks. As is illustrated, each button 42 has a threaded member 44 which is used to couple the button to the track. In the prior art, the threaded member 44 is driven into a plastic insert in the slots 38,40 causing the plastic insert to expand and frictionally engage sides of the slots. During use, the plastic is stressed and deforms such that the buttons become loose and may detach from the track. The present invention overcomes this problem using a plastic insert or stud-base 45 that functions only to guide the threaded member 44 into the slots 38,40. The stud base 45 has a circular plate member 46 with a central hole 48. Extending from member 46 are a pair of spaced legs 50 having a thin wall section 52 and an enlarged end section 54. As shown in FIG. 6, the legs 50 are relatively wide and prevent rotation of stud base 45 when inserted into groove 38 or 40 while allowing the stud base to be slid along the length of a track in order to align the stud base at a desired location. The enlarged end section 54 prevents the stud base 45 from slipping out of the grooves 38,40 during the alignment process or as the buttons 42 are being threadedly attached to the stud base. As the threaded member 44 is driven into the stud base 45, the threads cut through the thin walls 52 of the stud base legs 50 and engage the metal of the track 14. Accordingly, there is a metal-to-metal connection between the buttons 42 and tracks 14,16 thereby avoiding loosening of the buttons from deformation of the plastic insert.

It will also be noted that the windshield is finished by the use of plastic trim strips 46 (shown in cross-section in FIG. 4) inserted over the side edges 48 of each track 14,16,18. The strips 46 are preferably vinyl or polyvinyl material and are relatively stiff so as to maintain their basic shape. Each strip 46 has a cantilevered portion 50 that is held in pressing engagement with an adjacent surface of the glass sheet 17 to provide a finished appearance. Strip 46 also includes a pair of spaced legs 52 that fit snugly about the side edges 48 of each track.

The present invention thus provides an improved method and apparatus for mounting a frangible sheet member, such as a curved windshield glass, into a surrounding metal frame or track. The invention further provides a method and apparatus for reduced stress mounting of a curved windshield to a boat deck. The invention still further provides an improved method and apparatus for attaching snap buttons to metal tracks of such windshields.

While the invention has been described in what is presently considered to be a preferred embodiment, various modifications will become apparent to those skilled in the art. It is intended therefore that the invention not be limited to the disclosed embodiment but be interpreted within the spirit and scope of the appended claims.

What is claimed is:

1. A method for mounting frangible sheet material in a metal frame, the frame having a channel for receiving an edge of the sheet material, comprising:

positioning a plurality of spacers in the channel for supporting an edge of the sheet material in spaced relationship from a bottom of the channel;

depositing a bonding agent in the channel at periodic intervals;

positioning the frame on the sheet material with the spacers contacting an edge of the sheet material; and holding the frame in position on the sheet material until the bonding agent has set.

2. The method of claim 1 wherein the sheet material comprises a glass sheet.

3. The method of claim 2 wherein the channel is wider than a thickness of the glass sheet such that spaces are defined between surfaces of the glass sheet and adjacent edges of the channel, and including inserting a plastic strip into the spaces.

4. The method of claim 3 wherein the frame comprises an aluminum strip.

5. The method of claim 3 wherein the frame and glass sheet form a windshield.

6. The method of claim 1 wherein the spacers comprise a plurality of elastomeric strips adapted for seating in a bottom of the channel.

7. The method of claim 1 and including the step of inserting a decorative plastic trim strip between a surface of the sheet material and adjacent sides of the channel.

* * * * *